May 5, 1959 J. G. KING 2,885,634
EMISSION TYPE TUBE ANALYZER
Filed June 18, 1956
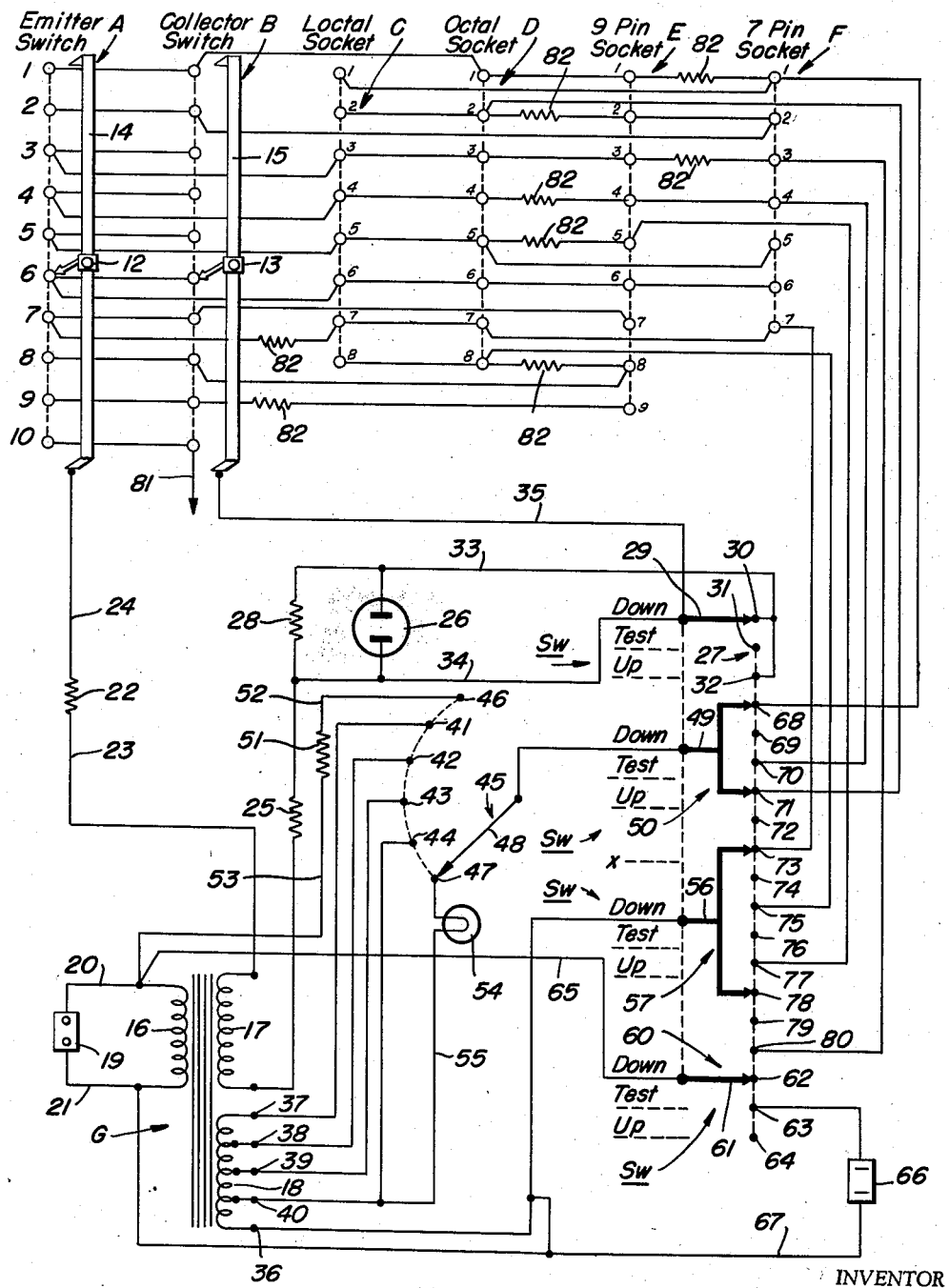
INVENTOR
John G. King
BY Fred Gerlach
ATTORNEY

United States Patent Office 2,885,634
Patented May 5, 1959

2,885,634

EMISSION TYPE TUBE ANALYZER

John G. King, Maywood, Ill., assignor to Tricraft Products Corporation, Chicago, Ill., a corporation of Illinois Application June 18, 1956, Serial No. 591,961

1 Claim. (Cl. 324—24)

The present invention relates generally to testing apparatus and more particularly to an improved radio and television tube analyzer.

Radio tube testing devices commonly in use are complicated and expensive devices which usually employ at least one meter, a multitude of switches, one or more tubes, and indicator bulbs, and extensive charts. They are often large and cumbersome and therefore do not readily lend themselves for use by technicians making service calls. Moreover, they often require recalibration and are useless for testing tubes whose identification markings have become illegible.

An important object of the present invention is to provide a radio and television tube analyzer which is extremely simple and compact and which may be used for testing tubes thoroughly and completely and in the shortest possible time.

Another object of the invention is to provide a tube analyzer which is of rugged construction so that it may be readily carried on service calls by radio and television service men.

Still another object of the invention resides in the provision of a radio and television tube analyzer which may be produced at low cost but which will perform testing operations not possible with expensive and complicated instruments.

A further object of the invention is to provide a device of this character which will permit the determination of the condition of radio tubes without recourse to manufacturers' charts, and will enable a technician to identify the elements of tubes whose identification markings have become illegible.

These and other objects of the present invention will be apparent from the following description, and from the accompanying drawing in which the single view is a circuit schematic of the improved radio and television tube analyzer.

The present invention utilizes as its basic principle of operation the existence of a definite relation between temperature and time in the cooling of a heated cathode to provide basis for an indication of the activity of a radio or television tube. More specifically, the length of time the cathode of a tube continues to emit electrons after the heating voltage is removed therefrom is directly related to the quality of said tube, i.e., its efficiency as an emitter. The more active the cathode, the further its temperature may fall before it will fail to provide an indication of space current flow and the longer will be the elapsed time. The elapsed time between cathode heating voltage shut-off and decay of space current flow to a value insufficient to provide an indication in a neon bulb or other indicator is a measure of the activity of the cathode.

Basically, the tube analyzing device constituting the present invention consists of a plurality of sockets of different types for receiving, one at a time, tubes to be tested; a source of high voltage including a series connected neon indicator bulb; a source of cathode or filament heating voltage; individually controlled switches for connecting the high voltage source and the indicator bulb in a series circuit with the cathode (or a filament terminal) and a grid or plate; and a test switch connected in said series circuit and movable initially to filament or cathode heating position and subsequently, after cathode heating has been effected, to a "test" position for interrupting the heating circuit and completing the high voltage circuit, whereupon the neon bulb will glow and thus indicate the flow of space current in the tube under test until, as previously explained, said flow decays to a value too low to energize said bulb. The device also includes a second bulb, of the filament type, which may be connected in the heater circuit for indicating tube filament continuity, and provision for a timing device to permit a determination of the elapsed time between heater voltage shut-off and decay of the flow of space current in the tube under test.

Referring now to the drawing, the letters A and B indicate generally multi-contact switches, each of which includes ten contacts and a contact arm. The contacts of each switch are numbered 1 through 10 and are engaged by contact arms 12 and 13, the arm 12 being provided for the switch A and the arm 13 for the switch B. For convenience of illustration the arms 12 and 13 are shown as sliders on guide members 14 and 15. In practice, however, the switches A and B can be of the well-known rotary type. The switches A and B will be referred to hereinafter as emitter and collector switches.

The letters C, D, E and F indicate tube sockets of different but conventional modern types. Again, for convenience of illustration, the contacts have been shown in alignment rather than in their usual circular arrangement. For added clarity, however, legends have been used to indicate the various types of sockets employed and the pin contacts have been numbered in accordance with usual practice.

A power transformer is shown at G and includes a primary winding 16 and secondary windings 17 and 18, the winding 17 being a high voltage winding, say 135 volts, and the winding 18 a filament or cathode heating winding. The terminals of the primary winding are connected to a conventional service line plug 19 by conductors 20 and 21. One terminal of the high voltage winding 17 is connected to the contact arm 12 through a resistor 22 by conductors 23 and 24 and the guide member 14, the resistor conveniently having a value of 20,000 ohms. The other terminal of the high voltage winding is connected in a series circuit which includes a resistor 25, a two element neon indicator bulb 26, a section 27 of a test switch SW, the guide member 15 and the contact arm 13, a limiting resistor 28 being connected in shunt with the bulb 26. The switch section 27 includes an arm 29 and contacts 30, 31 and 32. As will be seen from a study of the diagram, the indicator bulb 26 is short-circuited during cathode or filament warm-up in a tube test by wiring which includes conductors 33 and 34, the arm 29 of the switch section 27 and the contact 30 or the contact 32 of said section. The contacts 30 and 32 are wired together and connected to the conductor 33, and the arm 29 is connected to the conductor 34 and, by a conductor 35, to the guide member 15 and thus to the contact arm 13.

The filament winding 18 includes a common terminal 36 and taps 37, 38, 39 and 40, the taps providing the various voltages needed for energizing the cathodes or filaments of the several different types of tubes used in modern radio and television receivers and other electronic apparatus. The taps 37, 38, 39 and 40 are led, respectively, to contacts 41, 42, 43 and 44 of a heater voltage selector switch 45. The switch 45 has additional contacts 46 and 47, and an arm 48 which is connected to the movable arm 49 of a second section 50 of switch SW. The contact 46 is connected to the conductor 20 in the transformer primary circuit through a current limiting resistor 51 by conductors 52 and 53, while the contact 47 is connected to one terminal of a continuity indicating bulb 54. The remaining terminal of bulb 54 is connected to tap 40 of the winding 18 by a conductor 55. The common terminal 36 is connected to the movable arm 56 of a third section 57 of switch SW.

A fourth section of switch SW is shown at 60 and includes an arm 61 and contacts 62, 63 and 64. The arm 61 is connected to the conductor 20 in the transformer primary circuit by a conductor 65 and the contact 63 is connected to one terminal of a timer socket 66, the other terminal of said plug being connected to the conductor 21, also in the transformer primary circuit, by a conductor 67. The contacts 62 and 64 are open circuited, as is the contact 31 of the first test switch section 27.

As indicated by the broken line X in the diagram, the movable arms of the test switch sections 27, 50, 57 and 60 are ganged together, and are movable to three positions, namely, a "down" cathode or filament heating position, a "test" position, and an "up" cathode or filament heating position. As will be explained in greater detail presently, the "up" and "down" positions are necessary to provide for the different cathode pin arrangements of the many tube types.

The movable arms of the test switch sections 50 and 57 are engageable with contacts 68 through 80, the contacts 68, 70, 71, 73, 75, 77 and 80 bearing numbers corresponding to numbers of the pin contacts on the sockets C, D, E and F. Contacts 69, 72, 74, 76, 78 and 79 are unnumbered. The movable arm 49 of the switch section 50 includes switch members that bridge four of the contacts 68 through 80, whereas the arm 56 of the switch section 57 includes members bridging two and six of said contacts. For example, when the test switch is in the "down" position shown on the diagram, the movable arm 49 will engage contacts 68 and 71 and the arm 56 will engage contacts 73, 75 and 78.

The connections between the test switch contacts and the pin contacts of the sockets C, D, E and F will now be described. The contact 68 of the test switch is connected to the pin contact 1 of each of the sockets C, D, E and F and to the corresponding contacts of the switches A and B. A current limiting resistor is connected between the said pin contact 1 of the 9 pin contact socket E and the same numbered pin contact of the socket F.

The test switch contact 69 is open. The contact 70 is connected to pin contact 4 of each of the sockets and to the number 4 contacts of the switches A and B, a current limiting resistor being connected between the number 4 pin contacts of the sockets D and E. Switch contact 71 is connected to pin contact 2 of each of the sockets C and D and, through a current limiting resistor, to the number 2 pin contacts of the sockets E and F and to the same numbered contacts of the switches A and B.

Switch contact 72 is open. Contact 73 is connected to the number 7 pin contacts of each of the sockets and to the number 7 contacts of the switches A and B, a current limiting resistor being connected between the number 7 pin of the socket C and said switches. Contact 74 is open. Contact 75 is connected to pin contacts 8 of the sockets C and D, a current limiting resistor being connected between the number 8 pin contacts of the sockets D and E, and the number 8 pin contact of said socket E being connected to the corresponding contacts of the switches A and B.

Contacts 76, 78 and 79 are open; contact 77 is connected to pin contact 5 of the socket E and, through a current limiting resistor, to the corresponding pin contacts of the sockets C, D and F and to the number 5 contacts of the switches A and B. Contact 80 is connected to the number 3 pin contact of the socket F and, through a current limiting resistor, to the corresponding pin contacts of the sockets C, D and E and the number 3 contacts of the switches A and B.

The number 6 contacts of the switches A and B are connected to the correspondingly numbered pin contacts of the sockets C, D, E and F, and the number 9 contacts of said switches are connected, through a limiting resistor, to the number 9 pin contact of the socket E. The number 10 contacts of the switches A and B are connected together and to a lead 81 adapted for connection to the grid cap of a tube under test, in the event the tube is provided with such grid cap.

The various limiting resistors, connected between the pin contacts of the sockets C, D, E and F as above described, may each conveniently have a value of 3000 ohms. Each of said resistors is shown at 82.

The operation of the radio and television tube analyzer will now be described.

The plug 19 is first inserted into a service outlet, for energizing the transformer G, and the arm 48 of the heater voltage selector switch 45 is engaged with the contact 47. A tube to be tested is then placed in its proper socket C, D, E or F. If the tube has a grid cap, the lead 81 should be connected to it (by a suitable clip). The test switch SW is then moved to the "up" position. If the bulb 54 lights, the switch SW is in the correct position for the tube under test and the filament or heater thereof is not open. If the bulb 54 fails to light, switch SW is moved to the "down" position, when said bulb should become energized. If bulb 54 fails to light in either "up" or "down" position of the switch SW, the tube under test has an open or high resistance filament. For convenience, the numbers of the pin contacts which will be energized in the "up" and "down" positions of the switch SW may be placed on the panel of the device adjacent said "up" and "down" positions. Thus, if the heater pin connections of a tube are known in advance, the switch SW may be moved to the correct position initially. In this connection it should be pointed out that certain types of tubes will show continuity in either "up" or "down" position of the switch SW. Such tubes have either an internal connection between the pins or are center tapped for series or parallel operation, and charts should be referred to for proper positions of the switch SW for complete filament tests. Tubes having heaters requiring over 50 volts will not show continuity by illumination of the bulb 54 but must be tested in another way, to be described hereinafter.

After heater or filament continuity of the tube under test has been established, in the manner above described, the arm of the switch 45 is moved to the correct position for said tube and the switch SW is moved to either "up" or "down" position, for heating the filament or cathode of the tube. After filament or cathode heating has been effected the tube is ready for the emission test. By referring to a chart, wherein the tube pin numbers can be readily found, the proper positions of the emitter and collector switches A and B can be located. Such a chart is supplied with each analyzer and a sample instruction therefrom, for three well-known tube types, is given below.

| Tube Type | Switch SW (Heater) Position | Filament Switch Position, Volts | Emitter Pin Numbers | Collector Pin Numbers $G_1$, $G_2$, Plate | Remarks |
|---|---|---|---|---|---|
| 6AG5 | Up | 5 to 12 | 2, 7 | 1, 6, 5 | |
| 50B5 | Up | 35 to 117 | 2 | 7, 6, 5 | Will show continuity in both "up" and "down" positions of switch SW. |
| 1D8GT | Down | 1.4 to 2 | 2, 7 | 5, 4, 3 10, 6 8 | Check each section separately. |

With the emitter and collector switches A and B in their proper positions for the tube under test, and the tube filament or cathode heated to operating temperature, the switch SW is moved to the "test" position. In this position the sections of the switch SW are shifted so that the short-circuit is removed from across the two element neon indicator bulb 26, the heater voltage is removed from the filament or cathode heater pins of the tube, and connections are completed to the timer plug 66. With the switch SW in the "test" position the cathode or filament will continue to emit electrons and such emission will be indicated by the glowing of one element of the neon indicator bulb 26. The length of time the glow remains provides an indication of the condition of the cathode (in heater type tubes). That is, the average active cathode will maintain a steady, strong flow of electrons for over 20 seconds. If the neon indicator bulb 26 stops glowing before the passage of 15 seconds, the cathode is weak and the tube should be replaced. The tube should be checked for emission as to all pins shown in the chart (abstracted hereinabove) or to the first or second electrode from the emitter (filament or cathode), and each section of multi-section tubes should be analyzed. Glowing of the bulb 26 with the emitter and collector switches A and B set to connect with pin contacts other than those shown in the chart, or in a base diagram, indicates a bad tube, with, however, the following exceptions: (1) tubes with filament voltages of 2 volts or less are in good condition if they show any indication in the tube 26; (2) good 5Y3 and 12AT7 tubes should emit for 4 seconds or longer.

With the tube analyzer tubes may also be tested for internal loose connections or "shorts." The loose connection test is made by simply tapping the tube under test while the bulb 26 is glowing. Any flickering of the bulb 26 indicates loose elements. A short circuit is indicated between the elements bearing the pin numbers on which the switches A and B are set if both electrodes of the neon indicator bulb 26 glow. As previously described, and shown in the drawing, the contact numbers of the emitter and collector switches A and B correspond to the tube pin (and socket) numbers. It will thus be seen that the analyzer will check the condition existing between any two elements in a tube. It will also be understood that the bulb 26 will show an A.C. glow (both electrodes energized) when the switches A and B are switched to the same corresponding pin numbers, because said switches will be connected to the same tube socket pin contacts.

A "gassy" tube is indicated by an indication by the bulb 26 of emission between the cathode and the filament.

The duration of emission after cathode heating may be determined accurately by the use of an electrically operated timer (which may be the second hand of an ordinary electric clock) plugged into the timer socket 66. Such a timer can be used, moreover, for comparing the sections of a multi-section tube. Since, as will be seen in the drawing, the timer is energized only when the test switch SW is in the "test" position, it will be possible to stop said timer merely by moving the switch SW to either "up" or "down" position when the bulb 26 stops glowing; the duration of the glow may then be read from the timer face. If desired, a lamp may be plugged into the socket 66 in lieu of a timer, to provide additional working light.

A television picture tube may be tested by utilizing a suitable adapter (not shown) and attaching it to the base of said tube, with the tube remaining in the television set. The adapter is plugged into the socket D and the analyzer is operated as above described.

To check filament continuity in tubes operating with filament voltages of over 50 volts, the switches A and B are set to engage the contacts corresponding to the filament pins of such tubes. A.C. glow of the neon indicator bulb will show filament continuity. This method of continuity checking may be used with other types of tubes, of course.

Many modern tube types utilize the same pin numbers for emitter and collector electrodes (cathode and grid(s) and plate). Thus such tubes may be checked rapidly for filament continuity and emission without changing the settings of the emitter and collector switches A and B.

From the foregoing description it will be understood that the radio and television tube analyzer constituting the present invention will not become obsolete due to the fact that all the information an operator would need to check any newly developed tube would be a base diagram of that tube.

What is claimed is:

In an electron tube analyzing apparatus, an indicator device, an electron tube socket having numbered pin contacts, switches having contacts numbered to correspond to the numbered pin contacts, circuit connections between the socket pin contacts and the switch contacts, a source of power including a transformer having a primary winding, a high voltage secondary winding and a filament winding, a test switch including a plurality of sections, certain of said sections including contacts connected to the socket pin contacts, a selector switch connected in circuit with a pair of the test switch sections and the filament winding, a circuit including another of the test switch sections, the indicator device, the first-mentioned switches and the high voltage secondary, and a supplementary heater voltage source connected to the primary winding and to the selector switch and to one of the sections of the pair of test switch sections, said test switch being movable to a position for energizing the heater of a tube in the socket and, after heating has been effected, to a second position for de-energizing the heater and completing the circuit which includes the indicator device, said first mentioned switches being adjustable for connecting pairs of tube electrodes in space current passage relation in said last mentioned circuit.

References Cited in the file of this patent
UNITED STATES PATENTS

| | | |
|---|---|---|
| 1,365,734 | Shackleton | Jan. 18, 1921 |
| 1,537,986 | Crisson et al. | May 19, 1925 |
| 2,014,379 | Hockner | Sept. 17, 1935 |
| 2,133,610 | Fausett | Oct. 18, 1938 |
| 2,221,556 | Roemisch | Nov. 12, 1940 |

OTHER REFERENCES

Article by Weiss, "Radio and Television News," December 1954; pp. 50, 114.